Dec. 15, 1959     A. KÖRNER     2,917,011
APPARATUS AND METHOD FOR MELTING FLY ASH IN
A TANGENTIALLY FIRED FURNACE CHAMBER
Filed May 10, 1956

INVENTOR.
ALFRED KOERNER
BY
ATTORNEY

United States Patent Office 2,917,011
Patented Dec. 15, 1959

2,917,011

APPARATUS AND METHOD FOR MELTING FLY ASH IN A TANGENTIALLY FIRED FURNACE CHAMBER

Alfred Körner, Korntal, Wurttemberg, Germany, assignor to Kohlenscheidungs-Gesellschaft, m.b.H., a corporation of Germany Application May 10, 1956, Serial No. 583,964

4 Claims. (Cl. 110—28)

This invention relates to improvements in a boiler furnace wherein a pulverized ash bearing fuel is tangentially fired. The invention is more specifically concerned with returning the collected fly ash to the combustion chamber and reducing the fly ash thus returned to a molten condition.

In a steam generator of this type the furnace is generally lined with fluid cooled tubes. The gas carrying the pulverized fuel, which usually is preheated air, is introduced into the slagging or combustion chamber by streams which are directed tangentially to an imaginary target circle concentrically located within the slagging chamber with respect to the vertical axis thereof.

The temperature in the slagging chamber is maintained above the fusion point of the ash causing a large percentage of the ash to drop out in a fluid state and collect at the bottom of the furance from whence the molten ash is disposed of by conventional means.

Some of the ash however is carried out of the chamber by the combustion gases in the form of fly ash and is removed from the gases by means of a dust collector. Disposal of the thus collected fly ash is usually uneconomical because of its powdery form. Accordingly the fly ash has been reintroduced into the furnace chamber in an attempt to melt it down so that it can be recovered in the form of coarse slag pellets which permit economical utilization of the ash as road building material, fill material, etc.

However it has been found in many cases that the fly ash thus introduced is again picked up by the gas stream and again recirculated through the boiler gas passages. This causes overloading of the dust collector by increasing the dust loading of the combustion gases to a degree which not only reduces the efficiency of the dust collecting equipment but also causes undesirable erosion of the heating surfaces of the boiler.

It is accordingly a primary object of the invention to reintroduce fly ash into the combustion chamber without materially increasing the dust loading of the combustion gases.

It is a further object of the invention to reintroduce the collected fly ash into the combustion chamber for melting without thereby overloading the dust collecting equipment and reduce its efficiency.

Another object of the invention is to reintroduce the fly ash into the furnace chamber in such a manner that it does not materially interfere with the combustion process of the fuel burned.

Additional objects and advantages will become apparent from the following description of an illustrative embodiment of the invention when read in conjunction with the accompanying drawings wherein.

Figure 1:
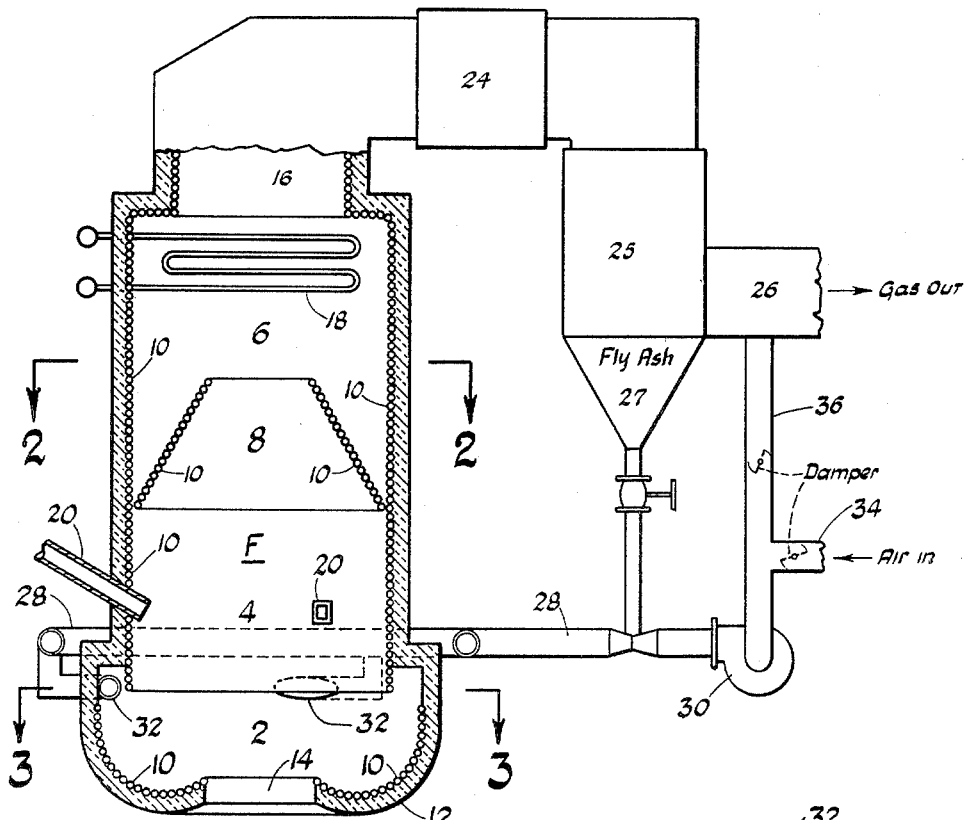
Figure 1 is an elevational section through a tangentially fired steam generator embodying the invention.

In the illustrative embodiment of Fig. 1 there is shown the furnace chamber F of a steam generator, said chamber having a slagging zone 2 in the lower part thereof. A combustion zone 4 arranged above the slagging zone 2 leads into a heating zone 6 through a gas outlet 8 shaped in the form of a frustum of a cone. The interior surfaces of the walls of the furnace chamber F as well as the gas outlet 8 are lined with fluid cooled tubes 10 receiving fluid from a boiler drum (not shown). The furnace F is also equipped with a slagging bottom 12 having a slag outlet 14, and with a gas offtake duct 16 in the upper end of the furnace chamber. Banks of heating tubes 18 for generating or heating steam are arranged in the heating zone 6.

Figure 2:
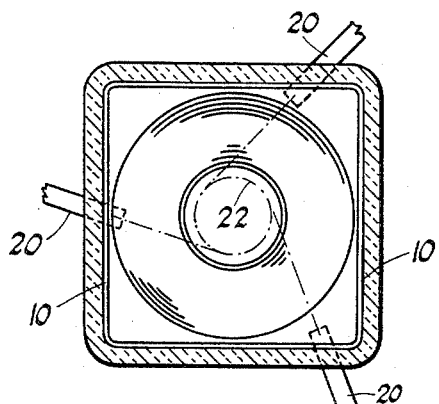
Figure 2 is a horizontal cross section taken on lines 2—2 of Fig. 1.

Pulverized fuel and air are fed into the furnace chamber F by burners 20 receiving fuel and air from sources not shown. These burners preferably are arranged in or adjacent the corners of the furnace chamber and discharge streams of fuel and air in directions tangential to an imaginary firing or target circle 22 as shown in Fig. 2. The fuel is burned at a temperature which exceeds the fusion point of the ash. This causes the ash to precipitate in a liquid state and to collect on the bottom 12 of the furnace chamber, from where it overflows through slag outlet 14 into a slag pit not shown.

Due to the tangentially directed streams of fuel and air the combustion gases follow a spiral path leading upwardly into the conical gas outlet 8 from whence they enter heating zone 6. After having given up a portion of their heat to the tube banks 18 the gases leave the furnace chamber F through gas offtake duct 16, flow over additional heat absorbing surface 24 and enter dust collector 25. After separation of the fly ash from the gases, the gases leave dust collector 25 by way of duct 26 and are discharged into the atmosphere through a stack (not shown).

Figure 3:
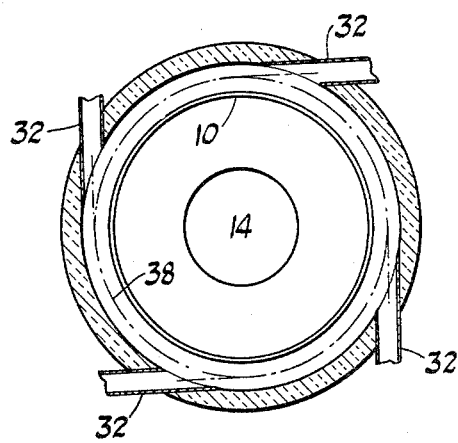
Figure 3 is a horizontal cross section taken on lines 3—3 of Fig. 1.

The fly ash collected in hopper 27 is blown into the slagging zone of the furnace chamber by way of pipe 28 and by means of fan 30, through nozzles 32 arranged around the perimeter of the lower portion of the furnace wall as shown in Fig. 3. The carrying gas for transporting the fly ash preferably is preheated air or recirculated gases delivered to fan 30 by way of duct 34 or duct 36 respectively.

As shown in Fig. 3 the fly ash is discharged into the slagging zone in streams tangential to an imaginary target circle 38. This target circle is inventively of a larger diameter than the diameter of firing or target circle 22, and is preferably arranged below the level of target circle 22.

In operation the fly ash entering slagging chamber 2, because it is directed to a target circle 38 which is larger than fuel target circle 22, follows a path skirting the rotating burning gas mass issuing from burners 20. Furthermore the fly ash entering the furnace chamber at a level below that of the fuel entrance is exposed to the molten ash fall-out precipitating downwardly from the rotating burning gas mass directly above.

The solid and extremely fine fly ash particles accordingly tend to agglomerate with the liquid ash droplets falling toward the furnace bottom. The suction of the rising gas stream therefore cannot effectively draw the dry fly ash particles up into and through the rotating burning gas mass.

In an apparatus equipped with the herein disclosed improvement the fly ash injected into the furnace in the manner hereinabove described is therefore effectively reduced to a molten condition without again being picked up by the combustion gases and without being recirculated through the boiler passages. Furthermore the ignition of the fuel is not interfered with, since the relatively cool fly ash does not come in contact with the fuel and air streams until ignition of the fuel has been well established and the process of combustion is well advanced.

An embodiment of the invention is hereinabove described in which the fly ash produced in the furnace of a steam generator is returned to the same furnace. Obviously fly ash originating in other furnaces, can, either in addition or alone, be reduced to liquid slag in the same advantageous manner. Furthermore, although the illustrative embodiment disclosed shows a furnace for a steam boiler, the invention can with equally beneficial results be applied to furnaces heating gases, vapors or fluids other than steam and water, such as air for instance.

While the preferred embodiment of invention has been here shown and described, it will be understood that changes in construction, combination, and arrangement of parts may be made without departing from the spirit and scope of the invention as claimed.

I claim:

1. The method of melting fly ash in a tangentially fired furnace chamber having a bottom for collecting and discharging liquid ash, comprising the steps of feeding into said chamber and burning therein a mixture of fuel and carrying air in a direction tangential to a first imaginary target circle concentrically arranged within said furnace chamber with respect to the longitudinal axis thereof; feeding into said chamber a stream of fly ash and carrying gas in a direction tangential to a second imaginary target circle concentrically arranged within said furnace chamber with respect to the longitudinal axis thereof, said second target circle being of a larger diameter than said first target circle, maintaining a furnace temperature adjacent said bottom which is above the fusion point of said fly ash to maintain said fly ash in molten condition, and discharging said fly ash from said furnace bottom in liquid form.

2. In a fuel burning system for burning finely divided ash bearing fuel in which a major portion of the ash is discharged in a molten condition and a minor portion leaves the furnace entrained in the combustion gases in the form of fly ash; the combination of a cyclonic furnace chamber; a furnace bottom for collecting said molten ash; means forming an opening for discharging the molten ash from said bottom; means forming an opening for discharging the gases of combustion from said furnace chamber; burner means for feeding a mixture of fuel and air for combustion into said furnace chamber in a direction tangential to a first imaginary target circle; means for collecting said fly ash; and means for feeding a mixture of said fly ash and carrying gas into the furnace chamber in a direction tangential to a second imaginary target circle, said first and said second target circles being concentric with respect to the longitudinal axis of said furnace chamber, said second target circle having a diameter which is larger than said first target circle, whereby said fly ash is being removed from said fuel burning system in liquid form without again passing out of said furnace chamber with said gases in form of fly ash.

3. The method of melting fly ash in a tangentially fired furnace chamber having a furnace bottom organization for collecting and discharging molten ash, comprising the steps of feeding into said chamber and burning therein a mixture of fuel and carrying air in a direction tangential to a first imaginary target circle concentrically arranged within said furnace chamber with respect to the longitudinal axis thereof; feeding into said chamber a stream of fly ash and carrying gas in a direction tangential to a second imaginary target circle concentrically arranged within said furnace chamber with respect to the longitudinal axis thereof, said second target circle being of a larger diameter than said first target circle, and being located at a level below said first target circle, maintaining adjacent said furnace bottom a temperature at least equal to the fusion temperature of said ash to maintain said ash in a molten condition, and discharging said molten ash from said furnace bottom in liquid form to prevent said ash from passing out of the furnace with said gases.

4. In a fuel burning system for burning finely divided ash bearing fuel in which a major portion of the ash is discharged in a molten condition and a minor portion leaves the furnace entrained in the combustion gases in the form of fly ash; the combination of a cyclonic furnace chamber having a bottom including an opening for discharging the molten ash, and means forming an opening for discharging the gases of combustion at the opposite end thereof; a plurality of burner means for feeding a mixture of fuel and air for combustion into said furnace chamber in a direction tangential to a first imaginary target circle; means for collecting said fly ash entrained in said gases; means feeding a mixture of said fly ash and carrying gas into the furnace chamber in a direction tangential to a second imaginary target circle; said first and said second target circles being concentric with respect to the longitudinal axis of said furnace chamber; and the distance from said first target circle to said slag outlet being greater than the distance from said second target circle to said slag outlet, said second target having a diameter larger than said first target circle.

References Cited in the file of this patent

UNITED STATES PATENTS

| | | |
|---|---|---|
| 2,483,728 | Glaeser | Oct. 4, 1949 |
| 2,518,800 | Lester | Aug. 15, 1950 |

FOREIGN PATENTS

| | | |
|---|---|---|
| 163,179 | Australia | June 2, 1955 |